Nov. 19, 1968  G. WINTRISS  3,411,345
APPARATUS FOR INDICATING LOAD ON MACHINE FRAMES
Filed Dec. 9, 1965
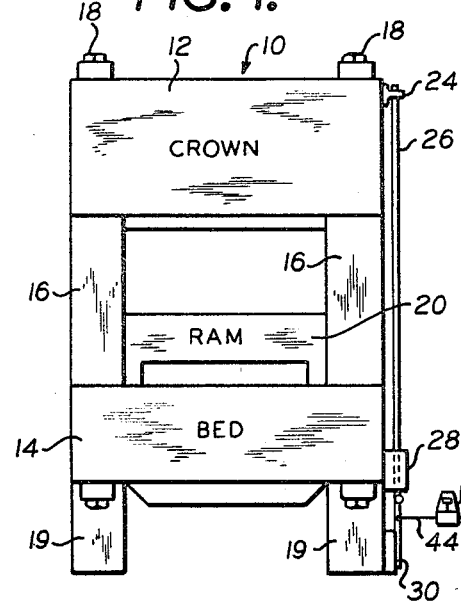
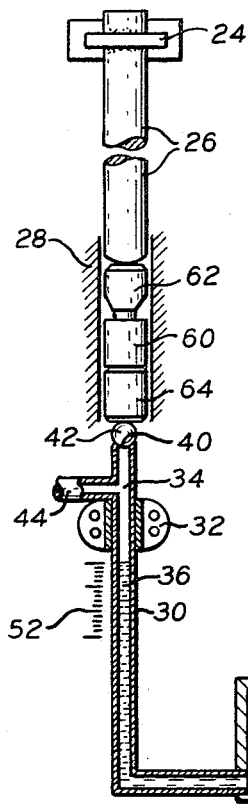
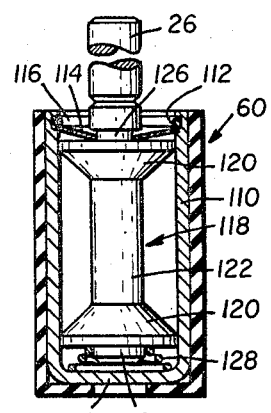
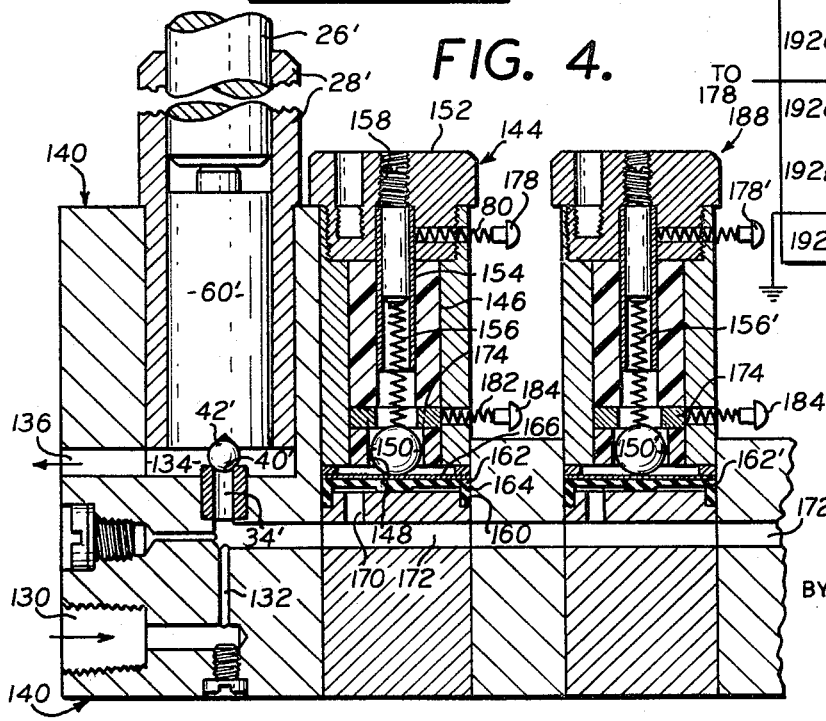
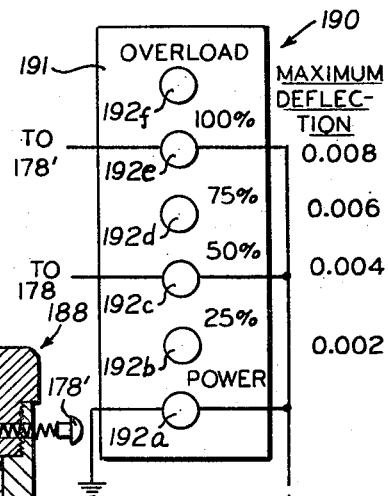
INVENTOR
George Wintriss
BY
ATTORNEYS.

United States Patent Office 3,411,345
Patented Nov. 19, 1968

3,411,345
APPARATUS FOR INDICATING LOAD ON
MACHINE FRAMES
George Wintriss, Carversville, Pa., assignor to Industronics Controls, Inc., New York, N.Y., a corporation of New York
Filed Dec. 9, 1965, Ser. No. 512,636
13 Claims. (Cl. 73—88)

ABSTRACT OF THE DISCLOSURE

This specification discloses apparatus for indicating the load on a press by measuring the elongation of the frame of the press when under load. A pneumatic system contains air under pressure and the escape of air from the system is controlled by a part connected to the frame of the press near the crank shaft. Elongation of the frame causes this part to move with respect to the pneumatic system and to cause a pressure change in the pneumatic system. This pressure change operates actuators for signal lights which selectively indicate progressively greater pressure changes in the pneumatic system. The load is preferably indicated in percentage of total safe load, and as an overload when it exceeds a predetermined value.

---

This invention relates to methods and apparatus for determining the elongation of a part, and more especially the elongation of the frame of a press.

Because of the substantial loading imposed on presses, there is some normal elongation of the frame, but presses and their parts are damaged by overloading and it is an object of this invention to detect overloading of the press by determining the elongation of the frame and whether this elongation is abnormal.

Another object of the invention is to provide means for indicating the elongation of a frame by a simpler and more reliable means than the strain gauges that have been used for the purpose in the prior art. This invention provides an indicator which is mechanical and much more rugged than the electronic equipment used with strain gauges.

Another object of the invention is to provide apparatus for indicating abnormal elongation of a frame accurately in spite of changes in dimensions which are caused by temperature variations.

Other objects, features and advantages of the invention will appear or be pointed out as the description proceeds.

In the drawing, forming a part hereof, in which like reference characters indicate corresponding parts in all the views:

FIGURE 1 is a diagrammatic view of a press equipped with apparatus for indicating frame elongation in accordance with this invention;

FIGURE 2 is a greatly enlarged diagrammatic view of the elongation-indicating means shown on the press in FIGURE 1;

FIGURE 3 is a greatly enlarged sectional view of a portion of the apparatus shown in FIGURE 2;

FIGURE 4 is a view similar to FIGURE 2 but showing a modified form of the invention; and FIGURE 5 is a diagrammatic view of a read out device for the apparatus shown in FIGURE 4.

FIGURE 1 shows a conventional press 10 having a crown 12 supported from a bed 14 by columns 16, the parts being tied together by tension rods 18 at all four corners of the press. The bed 14 is shown with legs 19 forming an integral part thereof. A ram 20 is movable toward and from the bed 14 by power means well understood in the art and of which no illustration is necessary for a complete understanding of this invention. The crown 12, bed 14, columns 16 and tie rods 18 comprise an integral unit which is the frame of the press.

When the ram 20 is forced down against work pieces on the bed 14, the reaction of the power means against the crown 12 causes some elongation of the frame.

A lug 24 is secured to the crown 12, and a rod 26 is rigidly attached to the lug 24, preferably by doweling. The lower end of the rod 26 extends into a guide 28, attached to the bed 14.

At a location below the guide 28, there is a tube 30 rigidly connected to the bed 14 by a bracket 32. This tube 30 encloses a chamber 34 (FIGURE 2). The lower part of the tube is filled with liquid, such as mercury 36 and the pressure of fluid in the chamber 34 above the column of mercury 36 holds the mercury down to a given level in the tube 30.

The tube 30 is open at its upper end and the top edge of the tube is a valve seat 40. A valve 42 rests on the seat 40 to prevent the escape of fluid from the chamber 34 so long as the valve 42 is held down firmly against the seat 40.

There is a branch passage 44 which communicates with the chamber 34. This branch passage 44 supplies fluid under a controlled pressure to the chamber 34. In FIGURE 1, the branch passage 44 is shown connected with a compressed air tank 46 through a pressure regulator 48.

So long as the valve 42 is held against the seat 40 with sufficient force to prevent the escape of fluid from the chamber 34, the top of the mercury column 36 is subject to pressure in the passage 44, as determined by the setting of the pressure regulator 48. If the downward pressure on the valve 42 decreases sufficiently to permit fluid to vent from the top of the tube 30, then the pressure in the chamber 34 decreases and the level of the liquid 36 rises in the tube 30. The greater the decrease in the load or downward pressure on the valve 42, the more the fluid pressure in the chamber 34 will lift the valve 42 and the more rapid will be the escape of fluid from the chamber 34. This increase in the rate of escape of fluid from the chamber 34 results in further reduction in the pressure in the chamber 34 and further rise in the level of the mercury column 36 in the tube 30. A scale 52, located along the side of the tube 30, indicates the height of the mercury column 36 in the tube 30 and this scale 52 can be graduated to measure the elongation of the frame of the press since the downward pressure on the valve 42 varies with the elongation of the frame of the press in a manner which will be explained.

The tube 30 communicates at its lower end with a reservoir 54 containing a substantial quantity of mercury; and there is a tube 56 which supplies fluid pressure to the mercury in the reservoir 54 so as always to maintain a pressure counter to the fluid pressure in the chamber 34.

The valve 42 is held down against the seat 40 by the rod 26. The rod 26 can be made to contact directly with the valve 42, or it can exert pressure against the valve 42 through intermediate motion-transmitting elements, and in the preferred construction, there are intermediate motion-transmitting elements imposed between the valve 42 and the lower end of the rod 26.

It is a feature of the preferred embodiment of the invention that the intermediate motion-transmitting elements change in length to compensate for temperature changes in the frame of the press, or other parts, and to compensate also for manufacturing tolerances.

FIGURE 2 shows a motion-transmitting element 60 between the rod 26 and the valve 42. The construction illustrated also includes a bar magnet 62 which connects the element 60 with the lower end of the rod 26, and a second bar magnet 64 which connects the elements 60 with the valve 42. With this operative connection between the valve 42 and the rod 26, the valve 42 is lifted from the seat 40 when the rod 26 moves upward, and this makes the apparatus more sensitive than when the pressure in the chamber 34 is required to lift the valve 42.

When the frame of the press elongates, as the result of the load on the press, the lug 24 moves upward and the rod 26 moves upward as a unit with the lug 24. The magnet 62, element 60, magnet 64 and valve 42 also move upward with the rod 26. When the load on the press is relieved, the lug 24 and rod 26 move back to their original position and it is desirable that the valve 42 should be again pressed against the seat 40 with the same force as that exerted before the press operated.

The element 60 will be described in detail in connection with FIGURE 3, and for the present it is sufficient to understand that it contains a spring which maintains a constant downward force on the valve 42 when there is no elongation of the press. This element 60 is constructed so that it tends to elongate and to take up any clearance which may occur as the result of upward movement of the rod 26 as the result of temperature changes in the unloaded press. The element 60 also takes up any clearances resulting from manufacturing tolerances or any clearances resulting from wear of the seat 40.

It is essential, however, that the element 60 should not expand in length during a stroke of the press and resulting elongation changes would be determined by the apparatus illustrated. To prevent this from happening, the element 60 is constructed with a dashpot containing a high-velocity liquid which limits elongation of the element 60 to such a slow rate that substaniatly no elongation occurs during the interval of a press stroke or other operation which loads the press frame. The rate of movement of the element 60 in its elongating action can be pre-determined by using different clearances and different viscosity liquids for the dashpot.

FIGURE 3 shows the element 60 in section. It includes a cylinder 110 of uniform diameter and closed at its lower end by a bottom wall 111. Near the upper end of the cylinder 110 there is an annular recess 112. A diaphragm 114 has its peripheral edge located in the recess 112; and there is a snap ring 116 in the recess 112 for holding the circumferential edge of the diaphragm 114 securely in the recess 112.

A piston element 118 is located within the cylinder 110. This piston element 118 has heads 120 at its upper and lower ends, the heads being connected by a stem 122. A stud 124 projects from the bottom of the lower head 120, and a piston rod 126 extends from the upper head 120, through an opening in the diaphragm 114 and to a level which is preferably slightly higher than the upper end of the cylinder 110.

There is a conical coil spring 128 in the lower end of the cylinder 110 below the lower head 120 of the piston element 118. At its upper end, the spring 128 is of a diameter to fit around the stud 124; and at its lower end, the spring 128 is of a diameter to fit within the bore of the cylinder 110. This is a particularly efficient form of spring for urging the piston element 118 upwardly in the cylinder; but it will be understood that the spring 128, in the broader aspects of the invention, is merely representative of means for giving the piston element 118 a bias toward the upper end of the cylinder.

When the spring 128 is fully expanded, the position of the piston element 118 is preferably somewhat below the annular recess 112 so as not to impose any load on the diaphragm 124 tending to push the diaphragm out of the upper end of the cylinder.

The diaphragm 114 is preferably made of a thin and pliable plastic sheet material. It has a center hole which surrounds the piston rod 126, and the purpose of the diaphragm 114 is to prevent leakage of liquid from the cylinder 110. The cylinder 110, below the diaphragm 114, is filled with liquid. Different kinds of liquids can be used and the rate of operation of the element 60 depends partly upon the viscosity of the liquid. The most important characteristic of the liquid is that it should be inert to the metal or other materials of which the parts are made, and it should also be inert to the material of the diaphragm 114.

The cylinder 110 slides freely in the guide 28 and so do the magnets 62 and 64.

FIGURE 4 shows a modified form of the invention. The parts corresponding to the construction shown in FIGURE 2 are indicated by the same reference characters with a prime appended. For example, a rod 26' is connected at its upper end with the frame of the machine in the same way as rod 26 of FIGURE 2. This rod 26' has its lower end slidable in a guide bearing 28'. The lower end of the rod 26' contacts with the upper end of a motion-transmitting element 60'. In the construction shown in FIGURE 4 the magnets 62 and 64 of FIGURE 2 are not used; though the use of such magnets is optional.

The motion-transmitting element 60' is movable in up and down directions in the guide bearing 28' and the lower end of this motion-transmitting element 60' contacts with a valve 42' which is normally held against a valve seat 40' by the downward pressure of the rod 26' acting through the motion-transmitting element 60'. In the construction as shown there is a recess in the bottom end of the element 60' for centering the valve 42'.

The valve 42' controls flow of air or other gas from a chamber 34'. The air is supplied to the chamber 34' from an inlet passage 130 and through a small diameter connecting passage 132. This air is supplied from a pressure regulator at a fixed outlet pressure so that when there is no escape of air from the chamber 34', the pressure in this chamber builds up to the delivery pressure of the regulator, for example, fifteen pounds per square inch. This value is given merely by way of illustration. When the downward pressure on the valve 42' is reduced so that the pressure in the chamber 34' can lift the valve 42' sufficiently to permit the escape of air from the chamber 34', some of the air escapes into a chamber 134 from which it flows through an exhaust outlet 136 to the ambient atmosphere.

The guide bearing 28' is secured to a frame or support 140 which is rigidly secured to the lower part of the frame of the machine, and the chambers 34' and 134 are formed in the support 140, and the passages 130, 132, and 136 are also formed in the support 140.

A detector 144 is secured to the support 140 at a location which is prefereably close to the guide bearing 28'. This detector includes a cylinder 146 which is preferably made of electrical insulating material and there is a bore 148 at the bottom of the cylinder 146 for holding a ball 150 that moves up and down in the bore 148 as a guide.

A cap 152 has a reduced diameter portion which threads into the upper end of the cylinder 146 and this cap 152 has a center holder 154 for a spring 156. The spring 156 is compressed between the holder 154 and the ball 150 and maintains a downward pressure on the ball. The holder 154 includes a plug 158 which screws up and down within the holder to change the pressure of the spring 156.

Below the cylinder 146 there is an annular recess 160 coaxial with the cylinder 146. A rubber diaphragm 162 extends across the entire cross-section of the cylinder 146 at the lower end of the cylinder and this diaphragm 162 has a peripheral rim 164 which extends into the annular recess 160. A spring steel disc 166 covers the top surface of the rubber diaphragm 162. This spring disc may have a thickness of 0.005 inch, this value being given by way of illustration. The spring disc 166 increases the spring rate of the combined disc and diaphragm assembly. The ball 150 contacts with the top surface of the disc 166.

Below the diaphragm 162 and within the circle defined by the annular recess 160, there is an air passage 170 which constitutes a branch of a header passage 172. This header passage 172 communicates with the chamber 34'.

Within the cylinder 146, there is a metal conductor ring 174 located at the place where the inside diameter of the cylinder 146 becomes less and reduces to the bore 148. This conductor ring 174 fits the cylinder 146 with a press fit so that it occupies a fixed position after assembly with the cylinder, or it can be clamped in place by any suitable means. It is important that the conducting ring occupies a fixed position in the detector 144. As the air pressure under the diaphragm 162 increases, it flexes the diaphragm 162 and the disc 166 upwardly and lifts the ball 150 into contact with the conductor ring 174.

When the ball 150 is in contact with the ring 174 a circuit is closed through the detector 144. This circuit extends from a terminal 178 through a conductor 180 and through the spring holder 154 and spring 156 to the ball 150. From the ball 150 the circuit continues through the conductor ring 174 and through another conductor 182 leading through the side of the cylinder 146 to a terminal 184 on the other side of the circuit.

There is another detector 188 located next to the detector 144. This second detector 188 is identical in construction to the detector 144 and corresponding parts are indicated by the same reference characters with a prime appended. In the operation of the invention, the detector 144 has its plug 158 adjusted so that the tension on the spring 156 is different from the tension on the spring 156' in the detector 188. The springs 156 and 156' of the detectors 144 and 188, respectively, are adjusted so that when the valve 42' is closed, the pressure in the chamber 34' and in the header passage 172 is sufficient to hold the balls 150 and 150' in contact with the conductor rings 174 and 174' of the detectors 144 and 144', respectively.

As the frame of the machine is elongated under load, and the pressure of the rod 26' on the motion-transmitting element 60' becomes less so that the valve 42' permits escape of air across the seat 40' and resulting reduction in pressure in the chamber 34', there is a corresponding reduction in pressure under the diaphragms of the detectors 144 and 188. As this pressure decreases, it reaches a point where it is no longer sufficient to hold the ball 150 or 150', depending upon which one has the greater spring pressure exerted on it, in contact with its corresponding conductor 174 or 174'. Thus the circuit through one of the detectors 144 and 188 is broken and this represents a certain percentage of the permissible load on the frame of the machine.

As the elongation of the machine frame continues and the rod 26' moves upward so as to permit wider opening of the valve 42', there is a further reduction in the pressure in the chamber 34' and header 172 and eventually the pressure drops enough to cause the other detector 144 or 188 to also break its circuit. This indicates that the load on the press frame is at a maximum and that no further increase in load should be permitted.

FIGURE 5 shows a read out device 190 which is illustrated diagrammatically as panel 191 having six lamps 192a–192f. It will be understood that there is a separate detector for each of these lamps. Since FIGURE 4 shows only two detectors, the lamp 192c is illustrated as connected with the detector 144 and the lamp 192e is illustrated as connected to the detector 188. In the read out device 190, the extinguishing of the lamp 192c indicates that the frame is subject to 50% of its allowable stress; and the extinguishing of the lamp 192e indicates that the frame is subject to the total allowable stress to which it should be subjected.

It will be understood that in order to operate all of the lamps on the read-out device 190, it is necessary to have five detectors similar to the detectors 144 and 188 with each of the detectors adjusted as to spring tension so as to break its circuit at a different pressure in the header passage with which all of the detectors are connected. For example, if the maximum permissible elongation of the frame were 0.008 inch, then the detector for operating the lamp 92b would have its spring adjusted so as to break the circuit of this lamp when the elongation of the frame amounted to 0.002 inch. The detector 144 would have its spring adjusted so as to break the circuit of the lamp 192c when the elongation of the frame amounted to 0.004 inch; and the detector for the lamp 192d would be adjusted to break the circuit of that lamp when the elongation of the frame amounted to 0.006 inch. The detector 188 would be adjusted to break the circuit of the lamp 192e when the deflection or elongation of the frame amounted to 0.008 inch. Another detector could be connected to the lamp 192f and adjusted to open the circuit of that lamp when the elongation of the frame reached some amount in excess of the desired maximum; for example, when the deflection reached 0.010 inch. The lamp 192a is shown for indicating that there is power on the circuit and this lamp 192a is merely connected across the power line which supplies power to the circuits of the other lamps through the detectors.

The preferred embodiment of the invention has been illustrated and described, but changes and modifications can be made and some features can be used in different combinations without departing from the invention as defined in the claims.

What is claimed is:

1. Apparatus for indicating the elongation of a frame including a chamber at a fixed location on the frame, indicator means communicating with the chamber, a vent on the chamber, a valve commanding the vent, a rod with one end connected with the frame at a location remote from the chamber, the other end of the rod being operably connected with the valve and holding the valve in closed position when there is no elongation of the frame, a motion-transmitting element between the rod and the valve capable of change of length, said motion-transmitting element having expansion means urging it to increase in length but having a control that retards the movement of the expansion means to a very slow rate, and means urging the indicator means to move against the pressure in said chamber and operable to move the indicator in response to changes in the pressure in the chamber caused by opening of the valve with movement of the rod upon elongation of the frame.

2. The apparatus described in claim 1 characterized by a seat against which the valve is held when in closed position, the valve being oriented with respect to the seat so that it is urged away from the seat by the pressure in the chamber, and the seat being oriented with respect to the rod so that the rod moves in a direction away from the seat as the frame elongates whereby said pressure opens the valve to vent the chamber upon elongation of the frame.

3. The apparatus described in claim 1 characterized by the control being a dashpot containing a viscous liquid.

4. The apparatus described in claim 1 characterized by the motion-transmitting element being connected with the rod and one end of said element moving as a unit with the rod.

5. The apparatus described in claim 4 characterized by the other end of said motion-transmitting element being operably connected with the valve and moving as a unit with the valve.

6. The apparatus described in claim 1 characterized by part of the structure being magnetized and the motion-transmitting element being connected with the rod and with the valve by magnetic attraction.

7. The apparatus described in claim 6 characterized by there being a bar magnet located between the rod and the motion-transmitting element and another magnet located between the valve and the motion-transmitting element.

8. The apparatus described in claim 2 characterized by a tube enclosing the chamber, and the indicator means in the chamber being a column of liquid, the means for urging the indicator means upward being a reservoir at the end of the tube remote from the valve, and means for supplying pressure to said reservoir in contact with the liquid, the seat for the valve being at the top of the tube, and a branch passage communicating with the chamber and through which fluid under pressure is supplied to the chamber that holds the liquid column down.

9. The apparatus described in claim 8 characterized by means for supplying fluid at controlled pressure through said branch passage to the chamber whereby the force holding the liquid level down varies with the ratio of the rate of escape of fluid past the valve to the rate of supply of fluid through the branch passage whereby the pressure changes and the height of the liquid column in the tube are proportional to the elongation of the frame and the resulting degree of opening of the valve.

10. An indicator for operation by elongation of a frame of a press to measure transient loads on a transient load press, said indicator including in combination means to connect opposite ends of the indicator at spaced locations on the frame, the indicator means including two members extending from opposite connection points on the frame toward each other, and including also abutment surfaces that contact with one another when there is no load on the frame, one of said members being a motion-transmitting connection between a first connection to the frame and one of said abutment surfaces including a rod and a resilient device for extending the length of the motion-transmitting connection to completely fill the distance between said first connection to the frame and the location at which the abutment surfaces contact with one another when there is no load on the press, said resilient device being automatically yieldable for movement of at least a portion of said device with respect to the rod to decrease the length of the motion-transmitting connection, the resilient device including damping means to restrain changes in the length of the resilient device in response to length changes in the frame, one of the said members including a chamber open at a first of said abutment surfaces for flow of fluid from the chamber, the second abutment surface being shaped and located to restrain flow of fluid from the chamber at the first abutment surface when there is no load on the frame, there being fluid flow from the open first abutment in response to separation of the abutment surfaces away from one another, means to supply a pressurized fluid to the chamber, and means responsive to the rate of fluid flow from the chamber for indicating elongation of the frame.

11. The indicator described in claim 10 characterized by the means responsive to the rate of fluid flow being a column of mercury, a tube in which the mercury is contained and having an upper portion above the mercury that provides said chamber, and means for varying the height of the column in the tube in accordance with the ratio of fluid flow to and from the chamber.

12. The indicator described in claim 10 characterized by means for supplying fluid to the chamber at a controlled rate less than the rate at which fluid flows from the chamber when said abutment surfaces are separated from one another and the chamber is at full pressure, indicating means including a plurality of detectors, each of which is responsive to a different pressure.

13. The indicator described in claim 10 characterized by the indicating means including a read out device with a plurality of signals, different signals being connected with different detectors.

References Cited

UNITED STATES PATENTS

| | | | |
|---|---|---|---|
| 375,054 | 12/1887 | Dudley | 73—401 |
| 1,950,049 | 3/1934 | Dodge et al. | 200—82.1 |
| 2,127,429 | 8/1938 | Schoepf et al. | 73—398 |
| 2,455,285 | 11/1948 | Versaw | 73—88 |
| 2,622,440 | 12/1952 | Friedman | 73—88 |
| 3,278,704 | 10/1966 | Smith | 200—83 |
| 3,304,386 | 2/1967 | Shlesinger | 200—83 |

RICHARD C. QUEISSER, *Primary Examiner.*

J. H. WILLIAMSON, *Assistant Examiner.*